US009203781B2

(12) United States Patent
Cheng et al.

(10) Patent No.: US 9,203,781 B2
(45) Date of Patent: Dec. 1, 2015

(54) EXTENDING VIRTUAL STATION INTERFACE DISCOVERY PROTOCOL (VDP) AND VDP-LIKE PROTOCOLS FOR DUAL-HOMED DEPLOYMENTS IN DATA CENTER ENVIRONMENTS

(71) Applicant: Cisco Technology, Inc., San Jose, CA (US)

(72) Inventors: Pei-Chun Cheng, Sunnyvale, CA (US); Shyam Kapadia, Santa Clara, CA (US); Nilesh Shah, Fremont, CA (US); Vipin Jain, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 289 days.

(21) Appl. No.: 13/960,929

(22) Filed: Aug. 7, 2013

(65) Prior Publication Data

US 2015/0046572 A1    Feb. 12, 2015

(51) Int. Cl.
  *G06F 15/173*  (2006.01)
  *H04L 12/931*  (2013.01)
  *G06F 9/455*  (2006.01)
  *H04L 12/46*  (2006.01)

(52) U.S. Cl.
  CPC .............. *H04L 49/354* (2013.01); *G06F 9/455* (2013.01); *H04L 12/4641* (2013.01)

(58) Field of Classification Search
  CPC ............ G06F 9/45558; G06F 9/45533; G06F 2009/4557; G06F 2009/45595; H04L 41/12; H04L 49/70
  See application file for complete search history.

(56) References Cited

U.S. PATENT DOCUMENTS

| 7,102,996 | B1 | 9/2006 | Amdahl et al. |
| 2010/0189117 | A1 | 7/2010 | Gowda et al. |
| 2010/0214949 | A1* | 8/2010 | Smith et al. ................... 370/254 |
| 2011/0060902 | A1 | 3/2011 | Nagata |
| 2011/0134793 | A1 | 6/2011 | Elsen et al. |

(Continued)

FOREIGN PATENT DOCUMENTS

WO    2012116749 A1    9/2012

OTHER PUBLICATIONS

Rasamsetty, "Virtualization of the Default Gateway Across the Virtual Port Channel Peers without using any FHRP," The IP.com Prior Art Database, Feb. 7, 2012, 4 pages.

(Continued)

*Primary Examiner* — Peling Shaw
(74) *Attorney, Agent, or Firm* — Edell, Shapiro & Finnan, LLC

(57) ABSTRACT

Techniques are provided for provisioning network resources for virtual machines. At a first switch device, a configuration request message is received from a virtual switch to provision virtual network segmentation resources for a virtual machine managed by the virtual switch. The first switch device provisions the virtual network segmentation resources for the virtual machine. The first switch devices sends to a second switch device a first synchronization message that includes information describing the virtual network segmentation resources. The second switch device is a peer of the first switch device. The first switch device also sends to the second switch device a second synchronization message that includes state information indicating that the first switch device is in an active state for servicing the virtual machine and that the second switch device is to be placed in a dormant state for servicing the virtual machine.

20 Claims, 5 Drawing Sheets

(56) References Cited

U.S. PATENT DOCUMENTS

| | | | |
|---|---|---|---|
| 2011/0238820 A1* | 9/2011 | Matsuoka | 709/224 |
| 2011/0317703 A1* | 12/2011 | Dunbar et al. | 370/392 |
| 2012/0131216 A1 | 5/2012 | Jain et al. | |
| 2013/0061225 A1* | 3/2013 | Nakagawa | 718/1 |
| 2013/0298126 A1* | 11/2013 | Nakagawa | 718/1 |
| 2014/0006585 A1* | 1/2014 | Dunbar et al. | 709/223 |

OTHER PUBLICATIONS

International Search Report and Written Opinion in counterpart International Application No. PCT/US2014/049578, mailed Nov. 3, 2014, 13 pages.

* cited by examiner

EXTENDING VIRTUAL STATION INTERFACE DISCOVERY PROTOCOL (VDP) AND VDP-LIKE PROTOCOLS FOR DUAL-HOMED DEPLOYMENTS IN DATA CENTER ENVIRONMENTS

TECHNICAL FIELD

The present disclosure relates to servicing virtual machines hosted by physical servers in a network environment.

BACKGROUND

Physical servers in a network may be located in a rack unit that houses a plurality of network devices. The physical servers may connect to a top of rack (ToR) switch that is configured to route communications between the physical servers in the rack unit and other network elements. The physical servers may host one or more virtual switches and virtual machines. The virtual switches may be configured to manage communications of virtual machines in particular virtual networks or subnets. Virtual machines may be segmented into particular virtual networks or subnets via control protocol messages exchanged between the virtual switch of a physical server and the ToR switch that manages the physical server. An example control protocol for provisioning the virtual machines is the Virtual Station Interface (VSI) Discovery Protocol (VDP) as defined by the Institute of Electrical and Electronic Engineers (IEEE) 802.1Qbg standard.

DESCRIPTION OF EXAMPLE EMBODIMENTS

Overview

Figure 1:
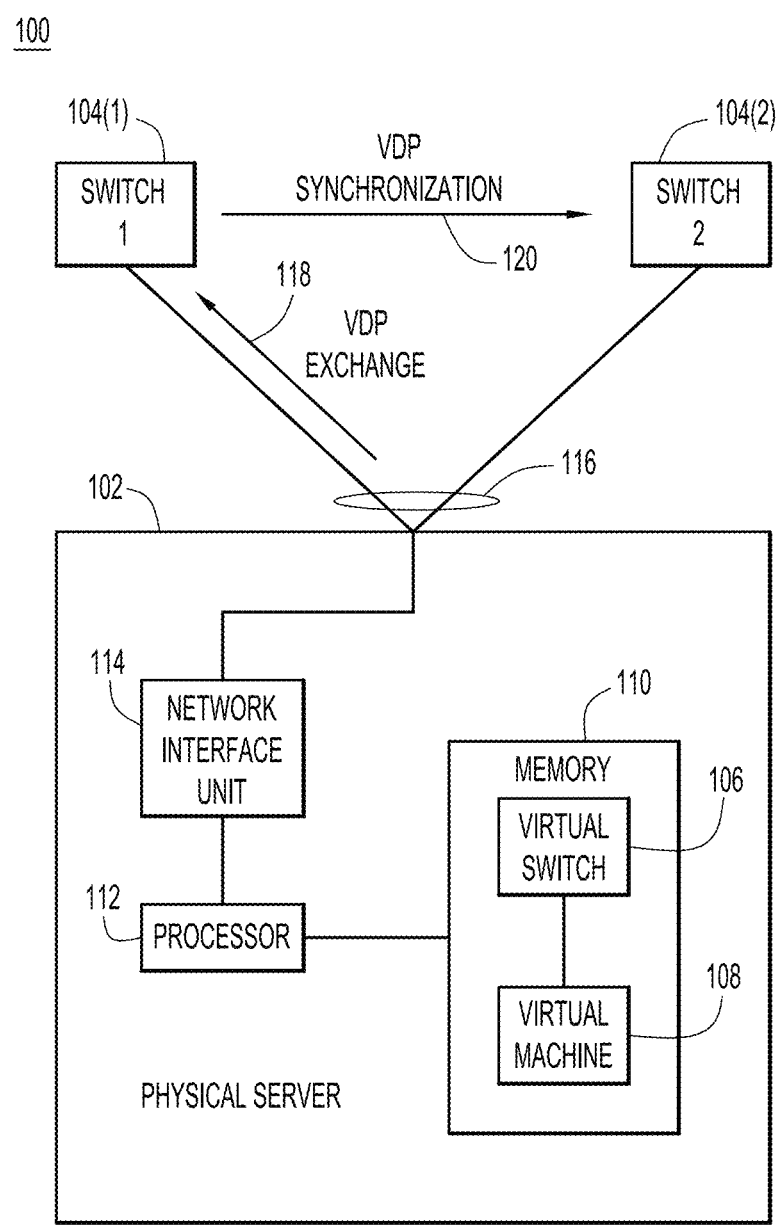
FIG. 1 shows an example system or network topology including a physical server that hosts a virtual switch configured to send and receive configuration messages with a plurality of switch devices.

Techniques are presented herein for provisioning virtual network segmentation resources for virtual machines. At a first switch device in communication with a physical server in a network, a configuration request message is received from a virtual switch hosted by the physical server to provision virtual network segmentation resources for a virtual machine. The virtual machine is hosted by the physical server, and virtual machine traffic is managed by the virtual switch. In response to receiving the configuration request message, the first switch device provisions the virtual network segmentation resources for the virtual machine. The first switch devices sends to a second switch device a first synchronization message that includes information describing the virtual network segmentation resources provisioned for the virtual machine. The second switch device is a peer of the first switch device. The first switch device also sends to the second switch device a second synchronization message that includes state information indicating that the first switch device is in an active state for servicing the virtual machine and that the second switch device is to be placed in a dormant state for servicing the virtual machine.

Example Embodiments

The techniques presented herein involve provisioning virtual network segmentation resources for virtual machines. An example network system/topology (hereinafter "network") is shown at reference numeral 100 in FIG. 1. The network 100 has a physical server, shown at reference numeral 102. The network 100 also has a plurality of physical switch devices ("switches") shown at reference numerals 104(1) and 104(2). Switch 104(1) may be referred to hereinafter as a "first switch device," "first switch" or "Switch 1." Switch 104(2) may be referred to hereinafter as a "second switch device," "second switch" or "Switch 2."

The physical server 102 is configured to host a virtual switch 106 and a virtual machine 108. The virtual switch 106 and the virtual machine 108 may be software stored in memory 110 of the physical server 102. For example, the virtual switch 106 may be a software program that performs the functions of a physical switch device, and the virtual machine 108 may be a software program that performs the functions of a physical server or computer. The virtual machine 108 is configured to exchange communications with other virtual machines in the network 100. For example, the virtual machine 108 may send and receive communications to and from other virtual machines in the network 100 via the virtual switch 106, processor 112 and network interface unit 114 of the physical server 102 and via switch 1 or switch 2. It is appreciated that any number physical servers hosting any number of virtual machines may be present in the network 100. For simplicity, FIG. 1 shows one physical server 102 that hosts one virtual switch 106 and one virtual machine 108. Virtual switch 106 may, in one example, manage communications of multiple virtual machines of the physical server 102.

Though not shown in FIG. 1, the physical server 102, switch 1 and switch 2 may be housed in a rack unit or "rack." Other physical servers may also be hosed in the rack. Switch 1 and switch 2 are responsible for managing communications (e.g., routing and forwarding) originating from and destined for physical servers (and virtual machines and virtual switches hosted by the physical servers) in the rack. Thus, switch 1 and switch 2 may be referred to as "Top of Rack" or "ToR" switches. Switch 1 and switch 2 constitute a pair of ToR switches that may be used to provide redundancy and fault-tolerance for communications associated with physical servers, virtual machines and virtual switches in the rack. Thus, switch 1 is a peer to switch 2, and switch 2 is a peer to switch 1. These ToR switches may be configured to communicate with a network controller unit ("network controller"), not shown in FIG. 1, which is configured to manage communications between ToR switches in different racks.

As stated above, physical server 102 hosts the virtual switch 106 and the virtual machine 108. The virtual machine 108 may exchange communications (e.g., data packets) with other virtual machines in the network 100 via switch 1 and switch 2. As the virtual machine 108 initially "joins" the network (i.e. when the virtual machine 108 is instantiated or activated), it is provisioned with certain network attributes in order to exchange communications. For example, upon instantiation, the virtual machine 108 is provisioned with virtual network segmentation resources, e.g., to assign the virtual machine 108 to a virtual Local Area Network (VLAN) and a subnet. In one example, virtual network segmentation resources may be provisioned on a per-switch or per-port basis (e.g., up to four thousand VLANs per switch or four thousand per port of a switch). Thus, when the virtual machine 108 is instantiated or joins the network 100, a ToR switch may select an unused VLAN for a given segmentation assignment. The virtual segmentation resources may also include a Switch Virtual Interface (SVI) assignment, an Access Control List (ACL) assignment, a Quality of Service (QoS) assignment, a Virtual Routing and Forwarding (VRF) assignment, etc. It should be appreciated that other network information known or heretofore contemplated may also be assigned to the virtual machine.

Additionally, upon instantiation, the virtual machine 108 must be provisioned with identifier information that may include an Internet Protocol (IP) address, a Media Access Control (MAC) address, a port number associated with the VLAN to which it is assigned, etc. The virtual machine 108 may be provisioned with this information by one or both of the switches 104(1) and 104(2). Once the virtual machine 108 is provisioned with this information, including the virtual network segmentation resources, the virtual machine 108 becomes capable of exchanging communications with other virtual machines (that have also been provisioned appropriately) in the network 100.

Typically, in order to provision a virtual machine that is instantiated or joins the network 100, configuration messages are exchanged between a virtual switch that manages the virtual machine and a single ToR switch to which the physical device hosting the virtual switch and virtual machine are connected. An example configuration message is a Virtual Station Interface (VSI) Discovery Protocol (VDP) message as defined by the Institute of Electrical and Electronic Engineers (IEEE) 802.1Qbg standard. VDP is a reliable protocol that enables configuration messages to exchanged between a VSI (e.g., a virtual switch) and a single ToR switch in order to provision a virtual machine managed by the virtual switch with network resources (including virtual network segmentation resources). Specifically, VDP enables provisioning of network resources on physical switch ports associated with the virtual switch, one of which may be associated with the virtual machine. For example, the virtual switch may have multiple physical switch ports associated with it, and the virtual machine may be configured to exchange communications via one of these ports. As VDP messages are exchanged between the virtual switch and the single ToR switch, the port that is associated with the virtual machine may be provisioned with the network resources. For simplicity, FIG. 1 shows a single virtual machine connected to a single virtual switch, and thus, the VDP message exchanges herein are described in association with this example. However, it should be appreciated that the techniques described herein may enable network resources to be provisioned for multiple virtual machines. It should also be appreciated that VDP is merely used as an example herein and that the techniques described herein are generally applicable to any hand-shake based protocol between a virtual switch and a ToR switch. As described, the techniques herein handle dual-homed scenarios by internal synchronization between ToR switches without requiring any change to the protocol itself. VDP and any VDP-like protocols may be used to effectuate this synchronization.

VDP enables a newly instantiated virtual machine to be provisioned with out-of-band signaling (e.g., without requiring separate connectivity for control information). The control messages exchanged as a part of VDP are typically between the virtual switch and a single ToR switch. Thus, for dual-homed network topologies, where two (or more) ToR switches may be deployed in a rack to service a virtual switch, current techniques may not allow for control messages to be exchanged between the virtual switch and dual-homed ToR switches as a part of VDP. The techniques described herein alleviate these shortcomings.

As shown in FIG. 1, the physical server 102 (and the virtual switch 106 hosted by the physical server 102) is dual-homed to switch 1 and switch 2. In other words, switch 1 and switch 2 are both configured to service (e.g., "manage") communications originating from and sent to the virtual machine 108 via the virtual switch 106. However, though the virtual switch 106 of the physical server 102 is serviced by switch 1 and switch 2, the virtual switch 106 is unaware of its connectivity to two ToR switches. Thus, switch 1 and switch 2 are said to constitute a pair of switches appearing as a single logical connection to the virtual switch 106, even though each of switches in the pair is configured to service communications of the virtual switch 106. In other words, the virtual switch 106 is agnostic to the pairing of switch 1 and switch 2 configured to service it and the virtual machine 108. The single logical connection perceived by the virtual switch 106 is depicted at reference numeral 116 in FIG. 1.

As described above, traditional VDP implementations involve exchanges between a virtual switch and a single ToR switch. The techniques described herein enable configuration messages, and specifically VDP messages, to be exchanged between a dual-homed virtual switch and the ToR switches configured to service communications to and from the virtual switch. These techniques can be extended to a multi-homed virtual switch, wherein more than two ToR switches are configured to service communications to and from the virtual switch. Among other benefits, the exchange of these configuration messages enables virtual machines managed by the virtual switch to be provisioned with network segmentation resources. Thus, as shown at reference numeral 118 in FIG. 1, VDP exchanges can occur between the virtual switch 106 and one of the ToR switches (switch 1 as an example), and as shown at reference numeral 120, the VDP exchanges can be synchronized between the pair of ToR switches. It should be appreciated that the VDP exchanges described herein are applicable to other configuration messages that may be exchanged between the virtual switch and the ToR switches.

Figure 2:
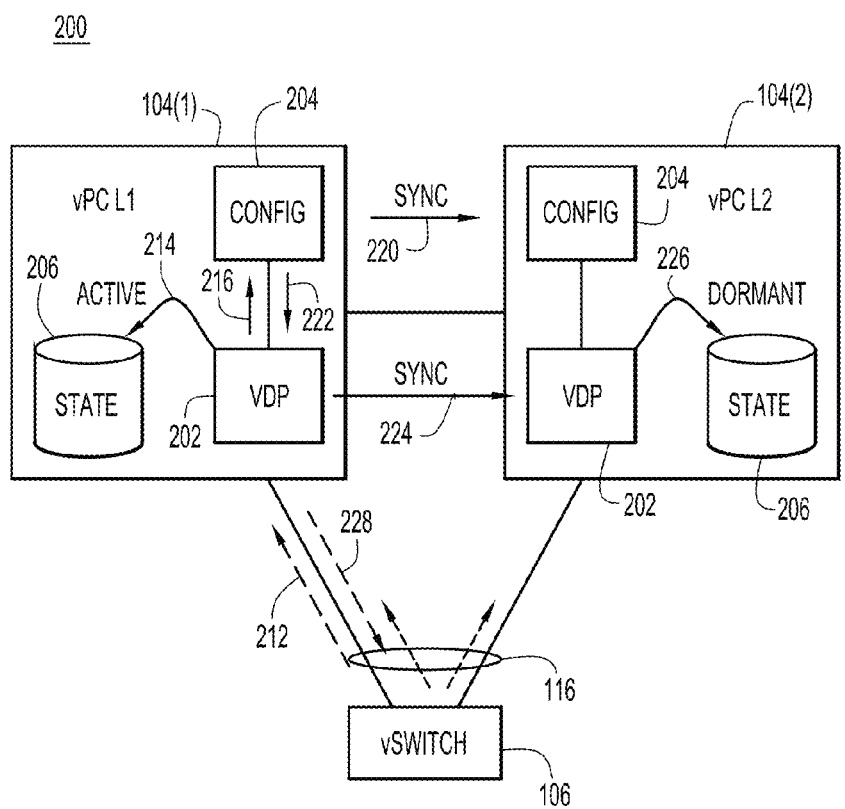
FIG. 2 shows an example topology including the virtual switch exchanging the configuration messages with the switch devices that appear as a single logical connection to the virtual switch.

Reference is now made to FIG. 2. FIG. 2 shows an example topology 200 including the virtual switch 106 exchanging configuration messages with switch 1. FIG. 2 shows switch 1 and switch 2 each comprising a VDP control module 202, configuration (config) module 204 and a state indication database 206. The VDP control module 202, configuration module 204 and the state indication database 206 may be stored in a memory component (e.g., software) of each of the switches. It should be appreciated that the virtual switch 106 exchanges communications with switch 1 and switch 2 via the physical server 102 on which it is hosted. At reference numeral 212 in FIG. 2, the virtual switch 106 sends to switch 1 a VDP association request message for the virtual machine 108. Upon receiving the VDP association request message, switch 1 becomes the active switch for servicing virtual machine 108, as shown at reference numeral 214. That is, switch 1 is placed in an active state (e.g., by updating the state indication database 206 to indicate that it is in the active state) in order to service the virtual machine 108. Such servicing includes provisioning network resources, including the virtual network segmentation resources, and managing network communications for the virtual machine 108.

At reference numeral 216 in FIG. 2, switch 1 sends an indication to its configuration module 204 to generate information comprising the network resources to be provisioned for the virtual machine 108. The configuration module 204 generates this information and may store this information, for example, in a database as a service profile for the virtual machine 108. Switch 1 then sends to switch 2, at reference numeral 220, a first synchronization message comprising the information about the network resources to be provisioned for the virtual machine 108. In one example, switch 1 may send the service profile associated with the virtual machine 108 to switch 2. This first synchronization message may be a configuration synchronization message enabled by VDP as well as other clients of the configuration module 204.

At reference numeral 222 in FIG. 2, the configuration module 204 informs the VDP control module 202 of the network resources provisioned for the virtual machine 108. Switch 1 then sends to switch 2, at reference numeral 224, a second synchronization message. The second synchronization message comprises state synchronization information that informs switch 2 that switch 1 has provisioned the virtual machine 108 with the network resources (including the virtual network segmentation resources), and accordingly, that switch 1 is operating in an "active" state for servicing the virtual machine 108. The state synchronization message also instructs switch 2 to operate in a "dormant" state for servicing the virtual machine 108 (e.g., a state in which switch 2 is inactive with respect to managing and provisioning the virtual machine 108, but is still configured to manage and provision the virtual machine 108 at a later time, should the state change from dormant to active). It should be appreciated that the "active" state and the "dormant" state as described herein is from the control-plane point of view. With respect to data forwarding into and from the virtual switch 106, both switch 1 and switch 2 are concurrently performing the data forwarding (i.e., switch 1 and switch 2 are in an active-active configuration from the point of view of data forwarding as opposed to an active-standby or active-dormant configuration from the control-plane point of view).

As shown at reference numeral 226, switch 2 updates its state indication database 206 accordingly to indicate its dormant state. At reference numeral 228, switch 1 then sends to the virtual switch 106 information of the network resources that switch 1 provisioned for virtual machine 108. As stated above, in one example, the network resources may have been provisioned for a physical port of the virtual switch 106 and associated with the virtual machine 108. For simplicity, the network resources are described herein as being provisioned for the virtual machine 108. Thus, after the provisioning of network resources, the virtual machine 108 can exchange communications in the network 100 via the physical server 102 that hosts it and via switch 1, which is in the active state for servicing the virtual machine 108. It should be appreciated that both switch 1 and switch 2 are aware of the provisioning of the network resources because traffic from the virtual machine 108 via the virtual switch 106 can be forwarded in the network 100 be either switch 1 or switch 2. That is, since the virtual switch 106 that services the virtual machine 108 has a port-channel upward to the pair of switch 1 and switch 2, it believes that it is connected to a single switch. Accordingly, the virtual switch will load balance across the different physical links that it has connected for upstream communication (e.g., towards the ToR switches).

As stated above, it should be appreciated that the virtual switch 106 is unaware that it may potentially be serviced by both switch 1 and switch 2, and thus, when the virtual switch 106 exchanges the VDP messages with switch 1, the virtual switch 106 is unaware of its connection to two (or more, as the case may be) ToR switches. The virtual switch 106 exchanges the VDP message with switch 1 in accordance with the existing VDP (or other configuration) protocol, and switch 2 is informed of the provisioning performed by switch 1 through the exchange of the first synchronization message from switch 1 to switch 2 and is informed of the active servicing state of switch 1 through the exchange of the second synchronization message from switch 1 to switch 2. The virtual switch 106 and the virtual machine 108 are unaware of the exchange of the synchronization messages between switch 1 and switch 2.

Figure 3:
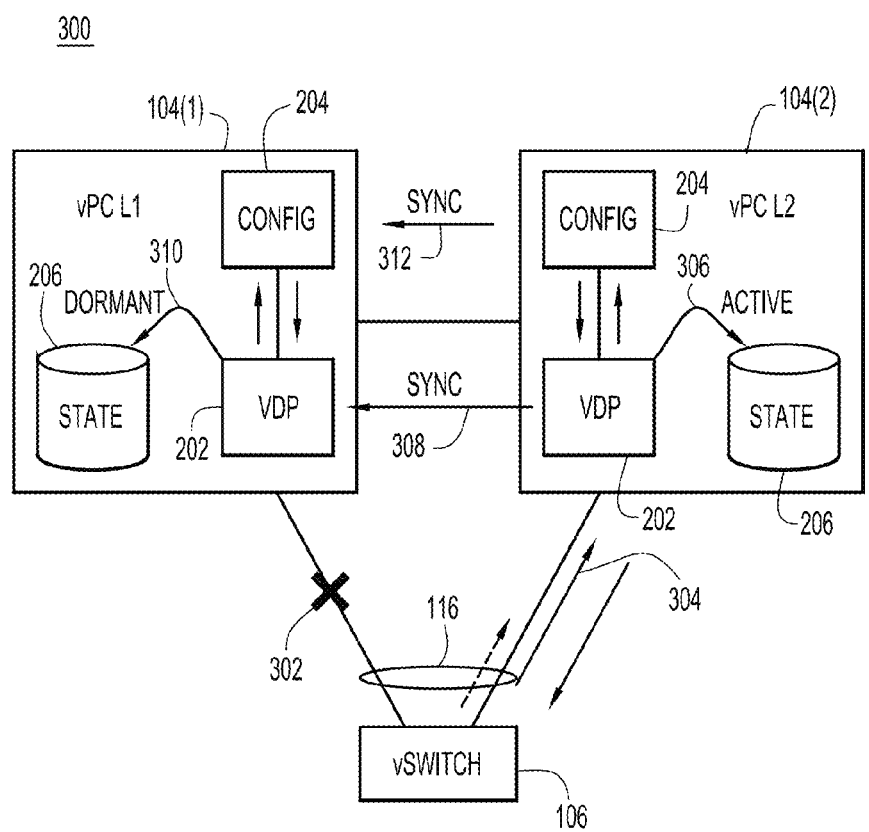
FIG. 3 shows an example topology of the switch devices changing their respective state information for servicing the virtual machine.

Reference is made to FIG. 3, which shows an example topology 300 of the switches 104(1) and 104(2) changing their respective state information for servicing the virtual machine 108. FIG. 3 presupposes that switch 1 was in a prior active state for servicing the virtual machine 108. In one example, switch 1 may have also initially provisioned the virtual machine 108 with the network resources. At reference numeral 302, a communication disruption event occurs between the virtual switch 106 and switch 1. The communication disruption event 302 may be a result of, e.g., load balancing/optimization operations performed in the network 100 to ensure efficient routing of communications (packets) in the network 100 or failure events in the network 100 itself. When the communication disruption event 302 occurs, switch 2 is made aware that the virtual switch 106 (and the virtual machine 108 that it manages) is unable exchange communications with switch 1. Switch 2 is made aware of this disruption in service through known protocols, particularly since it is paired with switch 1 as a peer switch for servicing the virtual machine 108.

In one example, switch 2 is made aware of this disruption of service through pairing technology, in which both switch 1 and switch 2 maintain shared identifiers. Both switch 1 and switch 2 notify each other of their respective communication status. In this example, when a disruption event occurs, switch 1 may check and determine that the link between switch 1 and the virtual switch 106 (configured with an identifier) is inoperable. Switch 1 may then notify switch 2 of the disruption of the link associated with the identifier of the virtual switch 106. As a result, switch 2 maps the identifier of the virtual switch 106 to its local link and learns that communications are to be exchanged with the virtual switch 106 via the link between switch 2 and the virtual switch 106. For example, from a data-plane point of view, in the event of a disruption of the link between a switch and the virtual switch 106, an interrupt software on the switch is notified about the fact that the corresponding port has gone down. The software programs various tables, including MAC address tables, to redirect traffic toward the dual-homed hosts that were reachable via the link that was disrupted. The redirection enables traffic to point to the peer-link (called a Multi-Chassis Trunk or MCT) so that the peer-link can forward the traffic to the dual-homed virtual machine 108 that resides behind (e.g., managed by) the virtual switch 106. From a control-plane point of view, a similar notification can be sent from the old-active switch (whose link went down) to the new active switch so that the role change from dormant to active can take place. The dormant switch can remain dormant until it receives an association message to changes its status to an active status.

After switch 2 learns of the communication disruption event 302, the virtual switch 106 later sends, at 304, a VDP association request message to switch 2. As stated above, the virtual switch 106 is unaware of the presence of multiple switches configured to service it, and this VDP association request message is sent as part of the standard VDP sequence between the virtual switch 106 and any switch that it perceives to be serviced by. In one example, the virtual switch 106 may be configured to detect the communication disruption event 302 and may in response, immediately send the VDP association request message to switch 2. In another example, the virtual switch 106 may be unaware of the communication disruption event 302 and may simply wait until the next keep alive instance to send a next VDP message. For example, the virtual switch 106 may ordinarily periodically send the VDP message regardless of whether a communication disruption event 302 has occurred.

In any event, upon receiving the VDP association request message from the virtual switch 106, the VDP module 202 of switch 2, at reference numeral 306, changes the state of switch 2 from its previous dormant state to an active state for servicing the virtual machine 108 (e.g., by changing information in its state indication database 206 to reflect its new active state). When switch 2 changes to the active state, switch 2 then becomes responsible for managing communications with the virtual machine 108. At reference numeral 308, switch 2 sends a synchronization message with state synchronization information to switch 1. The state synchronization information indicates to switch 1 that switch 2 has changed from the dormant state to the active state, and thus instructs switch 1 to change from the active state to the dormant state (as shown at 310) (e.g., by changing information in its state indication database 206 to reflect its new dormant state). It should be appreciated that switch 2 can seamlessly service the communications of the virtual machine 108 since it has previously received the provisioning information (e.g., from switch 1) at the initial VDP request initiated by the virtual switch 106. However, switch 2 may also provision the virtual machine 108 with the network resources by using a process similar to that performed by switch 1, as described in connection with FIG. 2 above. That is, switch 2 may provision the virtual machine 108 and may exchange, at 312, a configuration synchronization message to switch 1 informing switch 1 of the new provisioning performed by switch 2. Thus, switch 2 may provision network resources, including virtual network segmentation resources, for the virtual machine in response to receiving a new configuration request message (e.g., the VDP association request message) from the virtual switch 106 and the virtual machine 108.

Figure 4:
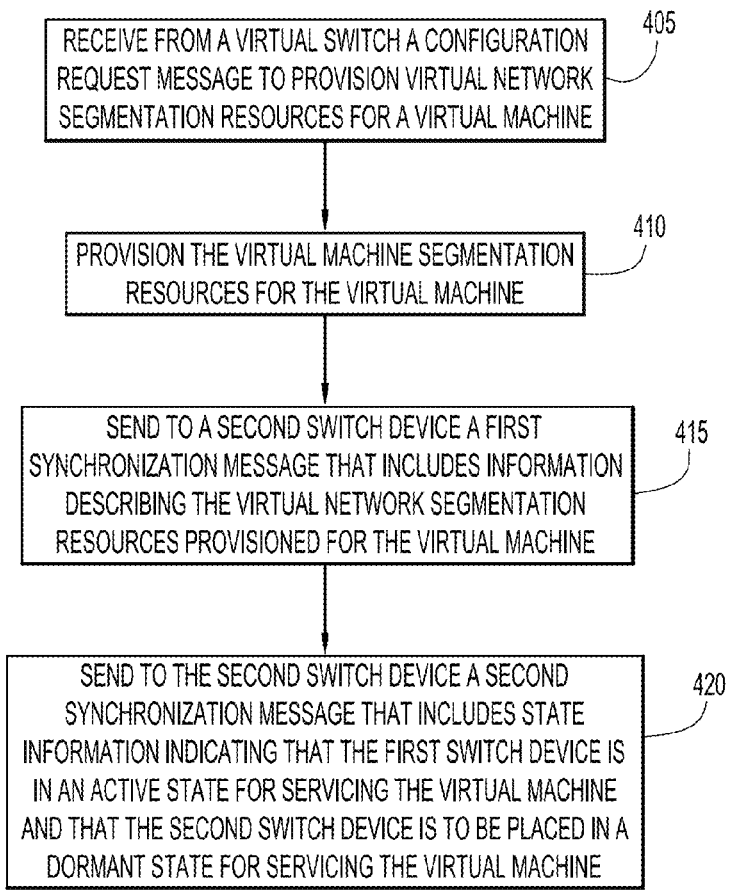
FIG. 4 shows an example flow chart depicting operations performed by the physical switch devices to exchange configuration messages with the virtual switch and with each other to provision a virtual machine hosted by the physical server.

Reference is now made to FIG. 4. FIG. 4 shows an example flow chart 400 depicting operations performed by switch 1 (or switch 2, as the case may be) to exchange communications with the virtual switch 106 and with each other to provision the virtual machine 108. For simplicity, the operations in FIG. 4 are described as being performed by switch 1, though it should be appreciated that the operations may also be performed by switch 2. At 405, switch 1 receives from the virtual switch 106 a configuration request message to provision virtual network segmentation resources for the virtual machine 108. At 410, in response to receiving the configuration request message, switch 1 provisions the virtual machine segmentation resources for the virtual machine 108. At 415, switch 1 sends to switch 2 a first synchronization message that includes information describing the virtual network segmentation resources provisioned for the virtual machine. Switch 1 also sends to switch 2, at 420, a second synchronization message that includes state information indicating that switch 1 is in an active state for servicing the virtual machine 108 and that switch 2 is to be placed in a dormant state for servicing the virtual machine 108.

Figure 5:
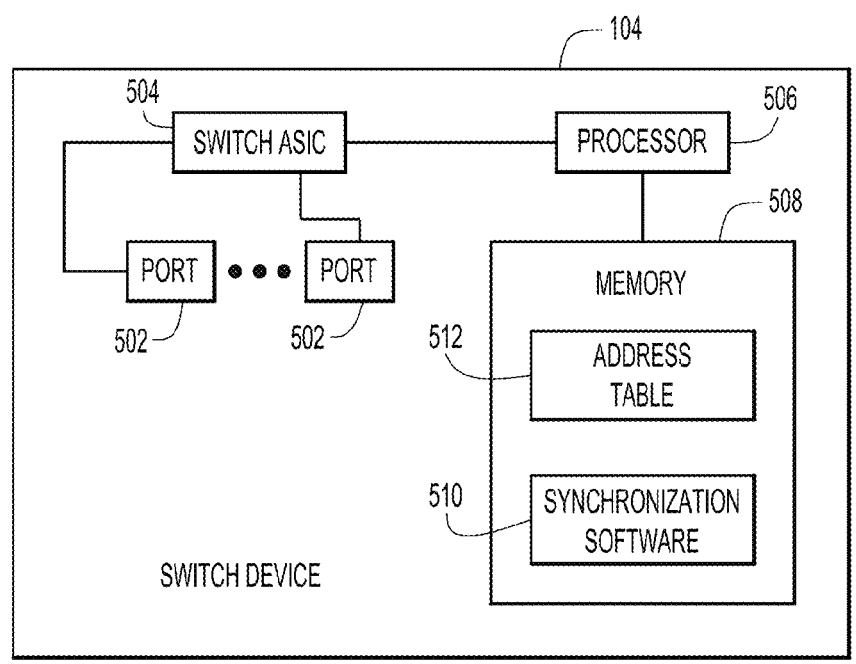
FIG. 5 shows an example block diagram of one of the physical switch devices configured to exchange configuration messages with the virtual switch and with other switch devices.

Reference is now made to FIG. 5. FIG. 5 shows a block diagram 104 of a physical switch (switch). The switch 104 in FIG. 5 may be either switch 1 or switch 2, and for simplicity, it is depicted generally as switch 104. Switch 104 comprises a plurality of ports 502, a switch application specific integrated circuit (ASIC) 504 (also called a switch unit or switch module), a processor 506 and memory 508. The ports 502 are configured to receive communications (e.g., packets, provisioning information, etc.) from devices in the network 100 and are configured to send communications to devices the network 100. The ports 502 are coupled to the switch ASIC 504, which is responsible for switching the communications to appropriate network devices. The switch ASIC 504 is coupled to the processor 506. The processor 506 is, for example, a microprocessor or microcontroller that is configured to execute program logic instructions (i.e., software) for carrying out various operations and tasks of the switch 104, as described above. For example, the processor 506 is configured to execute synchronization software 510 to provision the virtual machine 108 and to exchange synchronization messages with other switch devices configured to service the virtual machine 108, as described herein. The functions of the processor 506 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 508 may comprise read only memory (ROM), random access memory (RAM), magnetic disk storage media devices, optical storage media devices, flash memory devices, electrical, optical, or other physical/tangible (non-transitory) memory storage devices. The memory 508 stores software instructions for the synchronization software 510. The memory 508 also stores software (not shown in FIG. 5) that enables the operations of the VDP control module 202, the configuration module 204 and the state indication database 206, described in connection with FIG. 2 above. The memory 508 also stores an address table 512 that stores address information for physical and virtual devices in the network 100. Thus, in general, the memory 508 may comprise one or more computer readable storage media (e.g., a memory storage device) encoded with software comprising computer executable instructions and when the software is executed (e.g., by the processor 506) it is operable to perform the operations described for the synchronization software 510.

The synchronization software 510 may take any of a variety of forms, so as to be encoded in one or more tangible computer readable memory media or storage device for execution, such as fixed logic or programmable logic (e.g., software/computer instructions executed by a processor), and the processor 506 may be an ASIC that comprises fixed digital logic, or a combination thereof.

For example, the processor 506 may be embodied by digital logic gates in a fixed or programmable digital logic integrated circuit, which digital logic gates are configured to perform the synchronization software 510. In general, the synchronization software 510 may be embodied in one or more computer readable storage media encoded with software comprising computer executable instructions and when the software is executed operable to perform the operations described hereinafter.

It should be appreciated that the techniques described above in connection with all embodiments may be performed by one or more computer readable storage media that is encoded with software comprising computer executable instructions to perform the methods and steps described herein. For example, the operations performed by switch 1 and switch 2 may be performed by one or more computer or machine readable storage media (non-transitory) or device executed by a processor and comprising software, hardware or a combination of software and hardware to perform the techniques described herein.

In summary, a method is provided comprising: at a first switch device in communication with a physical server in a network, receiving from a virtual switch hosted by the physical server a configuration request message to provision virtual network segmentation resources for a virtual machine hosted by the physical server and for which virtual machine traffic is managed by the virtual switch; in response to receiving the configuration request message, provisioning the virtual network segmentation resources for the virtual machine; sending to a second switch device that is a peer of the first switch device and which is in communication with the physical server and the virtual machine a first synchronization message that includes information describing the virtual network segmentation resources provisioned for the virtual machine; and sending to the second switch device a second synchronization message that includes state information indicating that the first switch device is in an active state for servicing the virtual machine and that the second switch device is to be placed in a dormant state for servicing the virtual machine.

In addition, one or more computer readable storage media is provided that is encoded with software comprising computer executable instructions and when the software is executed operable to: receive at a first switch device from a virtual switch hosted by a physical server a configuration request message to provision virtual network segmentation resources for a virtual machine hosted by the physical server and for which virtual machine traffic is managed by the virtual switch; provision the virtual network segmentation resources for the virtual machine in response to receiving the configuration request message; send to a second switch device that is a peer of the first switch device and which is in communication with the physical server and the virtual machine a first synchronization message that includes information describing the virtual network segmentation resources provisioned for the virtual machine; and send to the second switch device a second synchronization message that includes state information indicating that the first switch device is in an active state for servicing the virtual machine and that the second switch device is to be placed in a dormant state for servicing the virtual machine.

Furthermore, an apparatus is provided comprising: a plurality of ports; a switch unit coupled to the plurality of ports; and processor coupled to the switch unit, and configured to: receive from a virtual switch hosted by a physical server a configuration request message to provision virtual network segmentation resources for a virtual machine hosted by the physical server and for which virtual machine traffic is managed by the virtual switch; provision the virtual network segmentation resources for the virtual machine in response to receiving the configuration request message; send to a peer switch device that is a peer of the apparatus and which is in communication with the physical server and the virtual machine a first synchronization message that includes information describing the virtual network segmentation resources provisioned for the virtual machine; and send to the peer switch device a second synchronization message that includes state information indicating that the apparatus is in an active state for servicing the virtual machine and that the peer switch device is to be placed in a dormant state for servicing the virtual machine.

The above description is intended by way of example only. Various modifications and structural changes may be made therein without departing from the scope of the concepts described herein and within the scope and range of equivalents of the claims.

What is claimed is:

1. A method comprising:
    at a first switch device in communication with a physical server in a network, receiving from a virtual switch hosted by the physical server a configuration request message to provision virtual network segmentation resources for a virtual machine hosted by the physical server and for which virtual machine traffic is managed by the virtual switch;
    in response to receiving the configuration request message, provisioning the virtual network segmentation resources for the virtual machine;
    sending to a second switch device that is a peer of the first switch device and which is in communication with the physical server and the virtual machine a first synchronization message that includes information describing the virtual network segmentation resources provisioned for the virtual machine; and
    sending to the second switch device a second synchronization message that includes state information indicating that the first switch device is in an active state for servicing the virtual machine and that the second switch device is to be placed in a dormant state for servicing the virtual machine.

2. The method of claim 1, wherein receiving comprises receiving from the virtual switch a Virtual Station Interface (VSI) Discovery Protocol (VDP) to request provisioning of the virtual network segmentation resources for the virtual machine.

3. The method of claim 1, wherein the first switch device and the second switch device make up a pair of switches that appear as a single logical connection to the virtual switch.

4. The method of claim 1, wherein sending the first synchronization message comprises sending the first synchronization message to enable the second switch device to exchange network communications with the virtual machine.

5. The method of claim 1, further comprising:
    at the second switch device, detecting a disruption event between the first switch device and the virtual machine;
    managing communications with the virtual machine with the second switch device; and
    at the second switch device, changing the state information from the dormant state to an active state.

6. The method of claim 5, further comprising provisioning at the second switch device the virtual network segmentation resources for the virtual machine in response to receiving a new configuration request message from the virtual machine.

7. The method of claim 5, further comprising, at the second switch device, sending a new synchronization message to the first switch device indicating that the second switch device has switched to the active state and that the first switch device is to be placed in the dormant state.

8. The method of claim 1, further comprising exchanging communications between the first switch device and the virtual switch without the virtual switch being aware of synchronization between the first switch device and the second switch device.

9. The method of claim 1, wherein provisioning comprises provisioning the virtual machine with segmentation assignments comprising one or more of a Virtual Local Area Network (VLAN) assignment, subnet assignment, Switch Virtual Interface (SVI) assignment, Access Control Lists (ACL) assignment, Quality of Service (QoS) assignment and Virtual Routing and Forwarding (VRF) assignment.

10. The method of claim 9, wherein provisioning comprises provisioning the segmentation assignments on multiple physical switch ports associated with the virtual switch.

11. One or more computer readable storage media encoded with software comprising computer executable instructions and when the software is executed operable to:
　receive at a first switch device from a virtual switch hosted by a physical server a configuration request message to provision virtual network segmentation resources for a virtual machine hosted by the physical server and for which virtual machine traffic is managed by the virtual switch;
　provision the virtual network segmentation resources for the virtual machine in response to receiving the configuration request message;
　send to a second switch device that is a peer of the first switch device and which is in communication with the physical server and the virtual machine a first synchronization message that includes information describing the virtual network segmentation resources provisioned for the virtual machine; and
　send to the second switch device a second synchronization message that includes state information indicating that the first switch device is in an active state for servicing the virtual machine and that the second switch device is to be placed in a dormant state for servicing the virtual machine.

12. The computer readable storage media of claim 11, wherein the instructions operable to receive comprise instructions operable to receive from the virtual switch a Virtual Station Interface (VSI) Discovery Protocol (VDP) to request provisioning of the virtual network segmentation resources for the virtual machine.

13. The computer readable storage media of claim 11, wherein the instructions operable to send the first synchronization message comprise instructions operable to send the first synchronization message to enable the second switch device to exchange network communications with the virtual machine.

14. The computer readable storage media of claim 11, further comprising instructions operable to exchange communications between the first switch device and the virtual switch without the virtual switch being aware of synchronization between the first switch device and the second switch device.

15. The computer readable storage media of claim 11, wherein the instructions operable to provision comprise instructions operable to provision the virtual network segmentation resources on multiple physical switch ports associated with the virtual switch.

16. An apparatus comprising:
　a plurality of ports;
　a switch unit coupled to the plurality of ports; and
　a processor coupled to the switch unit, and configured to:
　　receive from a virtual switch hosted by a physical server a configuration request message to provision virtual network segmentation resources for a virtual machine hosted by the physical server and for which virtual machine traffic is managed by the virtual switch;
　　provision the virtual network segmentation resources for the virtual machine in response to receiving the configuration request message;
　　send to a peer switch device that is a peer of the apparatus and which is in communication with the physical server and the virtual machine a first synchronization message that includes information describing the virtual network segmentation resources provisioned for the virtual machine; and
　　send to the peer switch device a second synchronization message that includes state information indicating that the apparatus is in an active state for servicing the virtual machine and that the peer switch device is to be placed in a dormant state for servicing the virtual machine.

17. The apparatus of claim 16, wherein the processor is further configured to receive from the virtual switch a Virtual Station Interface (VSI) Discovery Protocol (VDP) to request provisioning of the virtual network segmentation resources for the virtual machine.

18. The apparatus of claim 16, wherein the processor is further configured to send the first synchronization message to enable the peer switch device to exchange network communications with the virtual machine.

19. The apparatus of claim 16, wherein the processor is further configured to exchange communications between the apparatus and the virtual switch without the virtual switch being aware of synchronization between the apparatus and the peer switch device.

20. The apparatus of claim 16, wherein the processor is further configured to provision the virtual network segmentation on multiple physical switch ports associated with the virtual switch.

* * * * *